United States Patent

[11] 3,630,611

| [72] | Inventors | August Hoyer<br>Penfield;<br>Karl E. Liechty, Pittsford, both of N.Y. |
|---|---|---|
| [21] | Appl. No. | 13,421 |
| [22] | Filed | Feb. 24, 1970 |
| [45] | Patented | Dec. 28, 1971 |
| [73] | Assignee | Xerox Corporation<br>Rochester, N.Y. |

[54] DOCUMENT REGISTRATION APPARATUS
5 Claims, 4 Drawing Figs.

[52] U.S. Cl. ............................................................. 355/75
[51] Int. Cl. ....................................................... G03b 27/62
[50] Field of Search .......................................... 355/72, 74, 75, 40

[56] References Cited
UNITED STATES PATENTS
2,589,825  3/1952  Kneitel .......................... 355/75
2,256,894  9/1941  Chadkin ........................ 355/74
3,089,384  5/1963  Baasner ........................ 355/74

*Primary Examiner*—Samuel S. Matthews
*Assistant Examiner*—Monroe H. Hayes
*Attorneys*—Paul M. Enlow, James J. Ralabate, Norman E. Schrader and Melvin A. Klein ABSTRACT: Document registration apparatus adapted to be positioned on the platen of a copying machine to present document information of different sizes along the optical centerline of an optical system providing enlarged or reduced size copy. The apparatus includes a base member located adjacent to the platen area to which a pair of document guide members are pivotally connected. The guide members are formed with guide surfaces to present precise registration for document material inserted on the platen. A planetary gear train is used to drivingly position the guide members at different positions to effect a desired movement for the guide members relative to the platen area for registration of the different size document material along the optical centerline.

DOCUMENT REGISTRATION APPARATUS

This invention relates to document registration apparatus for use in conjunction with copying machines in which different size document material placed on a transparent platen for copying by projection along the optical centerline of the optical system providing an enlarged or reduced size copy. In the reproduction field, it is known that certain optical systems for copying machines, as for example, xerographic copying machines are capable of producing different size copies at different magnifications as described, for example, in U.S. Pat. No. 3,476,478. Usually the document material is placed along one edge of the platen and the optical system is shifted to accommodate different changes in magnification required for the different size images to be reproduced on copy sheet material. Usually, it is necessary to provide movement for either the object plane or the image plane or alternatively to shift optical components along the optical axis to achieve changes in magnification desired.

The present invention is for the purpose of registering different size document material on the platen of a copying machine having a variable magnification lens system having relatively movable lenses along the optical centerline. A lens system of this type is described in copending application Ser. No. 721,333 filed on Apr. 15, 1968 by Hoyer et al.

It is therefore an object of the present invention to improve copying apparatus capable of copying different size document information.

It is another object of the present invention to enable copying different size document information by projection along a straight optical centerline.

It is another object of the present invention to align different size document material in the center of a platen upon a copying machine in predetermined relationship with the optical centerline.

It is another object of the present invention to enable copying different size document material along an optical path which has a fixed optical conjugate.

For a better understanding of the invention as well as further objects and features thereof reference is had to the following detailed description to be read in connection with the accompanying drawings wherein.

Figure 1:
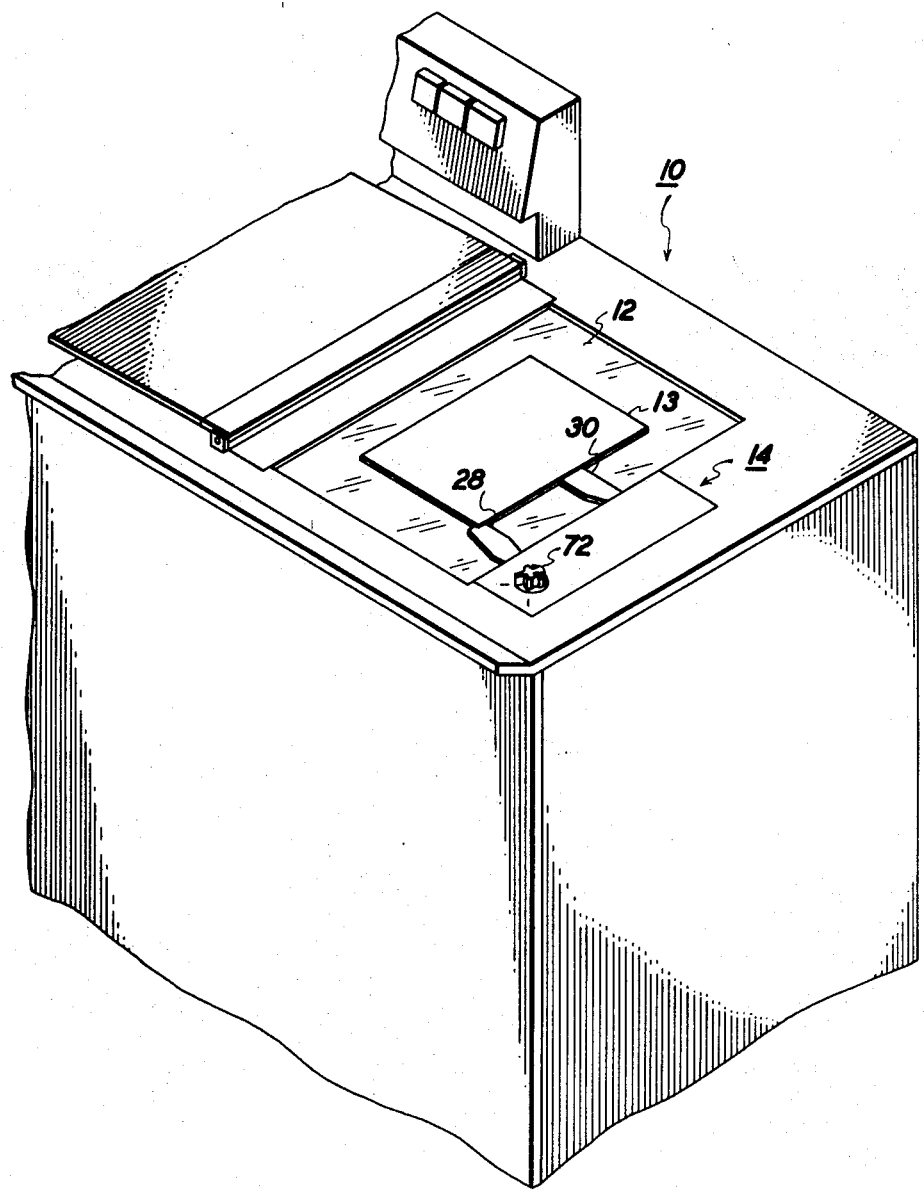
FIG. 1 is an exterior view of a variable magnification reproduction machine incorporating a document registration apparatus according to the present invention.

Referring now to FIG. 1 of the drawings, there is shown the exterior of a variable magnification reproduction machine 10 which may be of the xerographic type and has a platen 12 on which document material 13 to be reproduced is positioned by document registration apparatus according to the present invention. An image of the document material 13 is projected along the optical centerline by an optical system including lenses adapted for relative movement along the optical centerline to thereby vary magnification. An optical system suitable for use with the present invention is described in the above-mentioned copending application.

It is desirable to have document material placed on the platen to be centered in overlying position with the optical centerline to insure that all of the document information is received on the copy sheets produced which may be enlarged or reduced as desired. Document registration apparatus 14 comprises a fixed plate member 20 received in the machine frame along one side of the platen 12 which member is formed with an opening 22 at the midportion thereof for purpose to be described hereinafter. Pivotally mounted to the plate member 20 are a pair of arm members 24 and 26 to which are pinned a pair of guide members 28 and 30, respectively. Guide member 28 is formed with a corner position portion 32 and a corner position portion 34 which serves to position the corner of document material placed on the platen for reproduction. In similar fashion, guide member 30 has edge portions 36 and 38 at right angles to one another for positioning the edges of the document material to correspond with the corner position portions 32 and 34, respectively. To position the guide members 28 and 30 in the proper optical position, there is a planetary gear drive system which positions the guide members in predetermined locations about 90° apart relative to the platen depending on the size of the document material to be reproduced. The drive system comprises a fixed gear member 42 secured to plate member 20 which meshes with an intermediate gear 44 which in turn meshes with another gear 46 which is supported on a shaft member 48 received by guide member 28 in a pressed fit. In similar fashion guide member 30 is driven through a fixed sun gear 52 which meshes with intermediate gear 54 which in turn meshes with another gear 56 which receives a shaft member 58 on which the guide member 30 is pressed.

Figure 2:
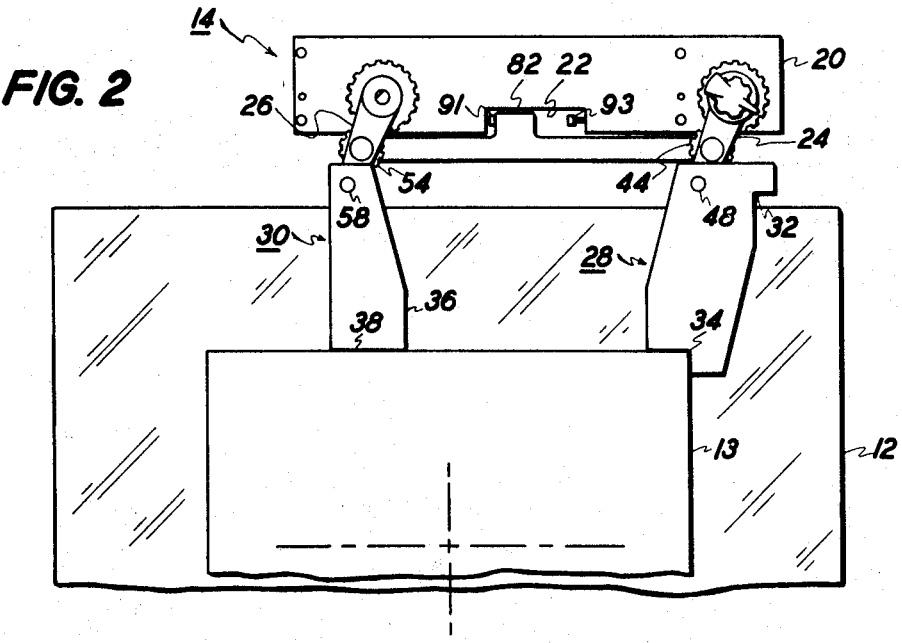
FIG. 2 is a plan view of the document registration apparatus.
Figure 3:
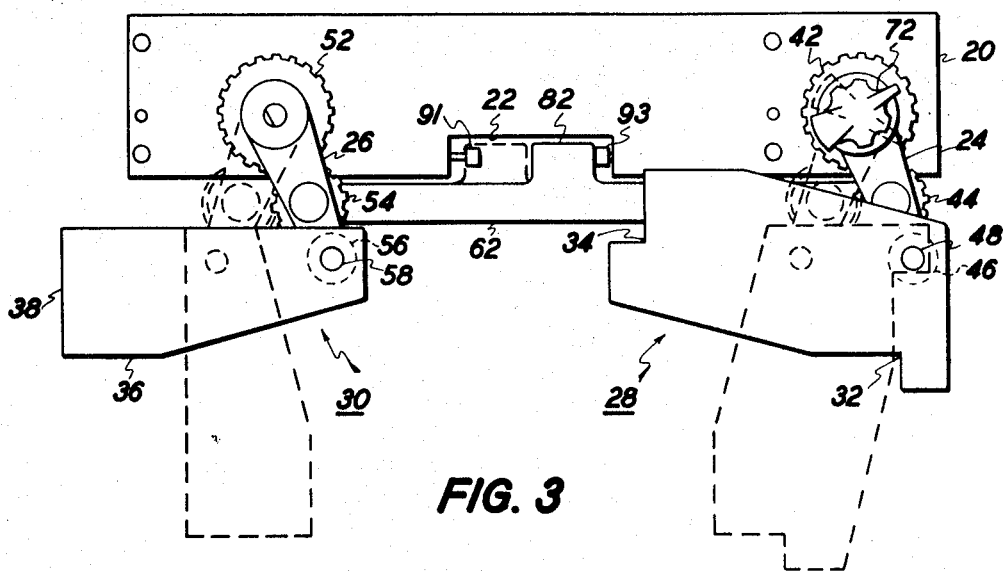
FIG. 3 is a plan view similar to FIG. 2 illustrating the different positions of the document guide members of the document registration apparatus.
Figure 4:
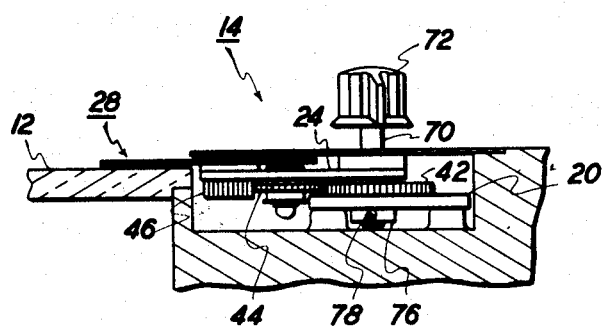
FIG. 4 is a side view of the planetary drive mechanism for positioning the document guide members.

To synchronize the movement of the guide members 28 and 30, there is provided a rod member 62 which connects intermediate gears 44 and 54 through pin members 66 and 68, respectively, and which also serves to connect the arm members 24 and 26, respectively. By this arrangement when movement is imparted to one of the arm members, the arm members are moved in parallelogram fashion carrying the intermediate gears 44 and 54 about the fixed gears 42 and 52, respectively, thereby positioning the guide members at their different selected positions for registrating different size document material relative to a fixed optical centerline (FIG. 2). To facilitate the movement of the guide members, a shaft member 70 carrying a knob 72 is secured to arm member 24 by plate 74 whereby upon rotation of the knob 72, the desired positioning of the guide members relative to the optical centerline is obtained. Shaft 70 is retained in plate member 20 by any suitable means as by slit collar 76 which may be fastened tightly about the shaft 70 by means of a pin 78.

In operation, the guide members 28 and 30 are pivoted about 90° so as to present different registrations for the different size document material to be reproduced on the platen. An extension 82 formed on rod 62 is received in opening 22 of plate member 20 and serves to engage a pair of switches 91 and 93 located at the ends of the path through which extension 82 is moved. Switches 91 and 93 serve to energize a suitable control circuit (not shown) which operates the different lens settings of the optical system to obtain the desired magnification changes of the reproduction apparatus.

By this invention, document material of different sizes may be placed on the platen area in registration with the optical centerline without fear of misaligning the material with the optical path. It will be appreciated that this system is highly desirable for reproduction system capable of producing enlarged or reduced size copies.

What is claimed is:

1. In a copying machine in which different size document material is to be reproduced from a predetermined position on a platen, apparatus for centering the document material along the optical centerline comprising
   a frame,
   document guide means pivotally mounted on said frame,
   planetary drive means including a fixed gear mounted on said frame and at least one driven gear mounted on said document guide means in driving engagement with said fixed gear,
   said guide means including a plate member being formed with at least two document registration portions defining the different locations for different size document material in centered overlying relation with the centerline of the optical axis whereby upon movement of said drive means, the plate member is positioned at predetermined locations to effect registration of the document material with the optical centerline.

2. Apparatus according to claim 1 wherein said drive means includes at least one intermediate gear member carried on an arm member pivoted on said frame.

3. Apparatus according to claim 2 wherein said document guide means comprises at least two spaced plate members, each plate member being associated with a corresponding arm member.

4. Apparatus according to claim 3 wherein said arm members are connected by a bar member having a cam portion, and switching means located in the path of said cam portion for actuation of a control for varying magnification of an associated machine optical system.

5. Apparatus according to claim 4 wherein one of said arm members is connected to shaft means for causing said arm members and associated bar member to move in parallelogram fashion relative to said frame.

* * * * *